Dec. 22, 1942.                H. N. SMITH                2,305,703
                            SLIPPER BEARING
           Filed April 25, 1942            2 Sheets-Sheet 1
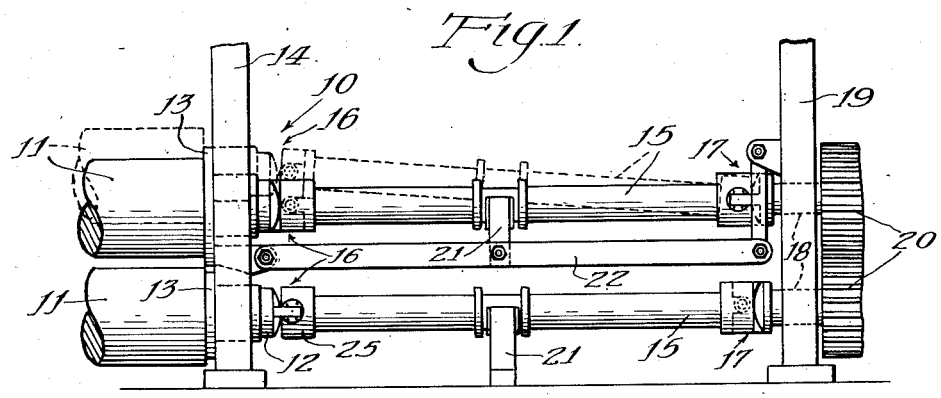
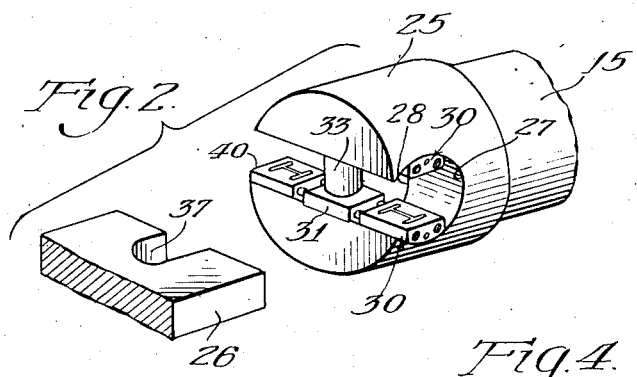
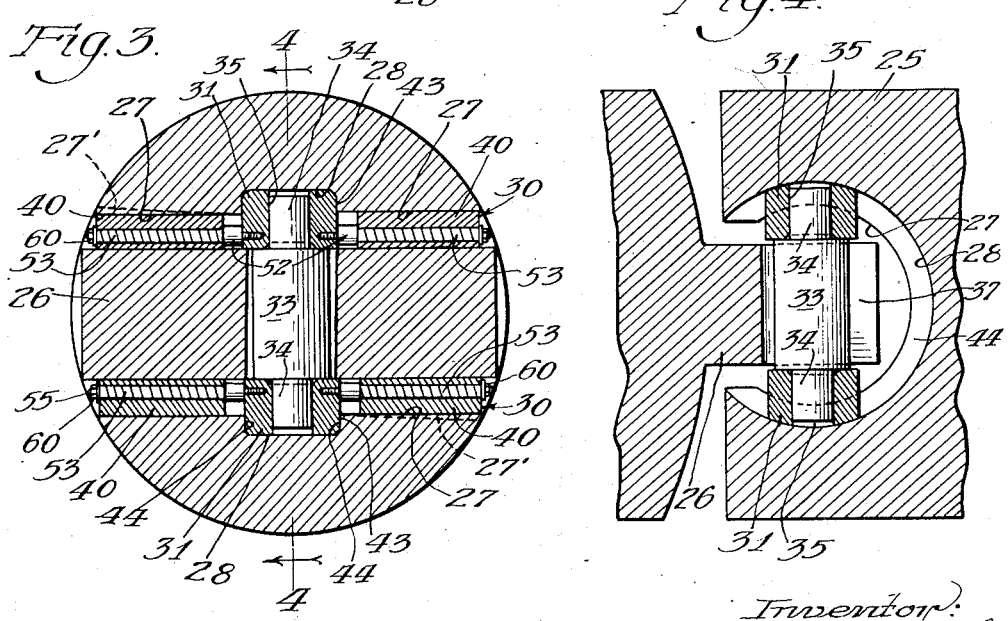
Inventor:
Harry N. Smith
By Wallace & Cannon
Attorneys.

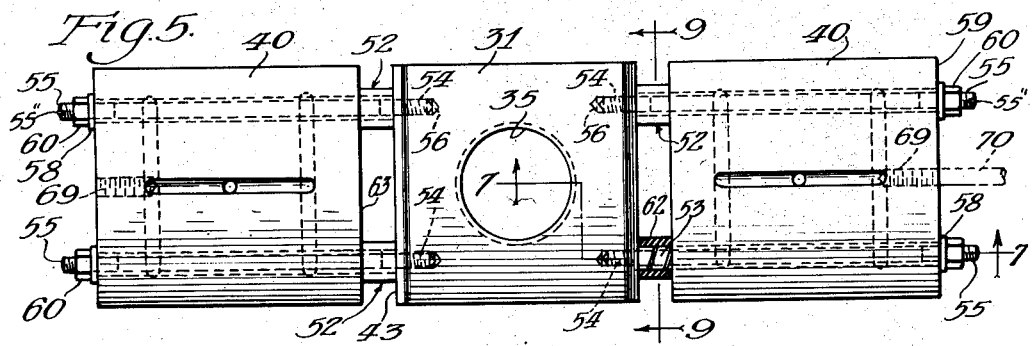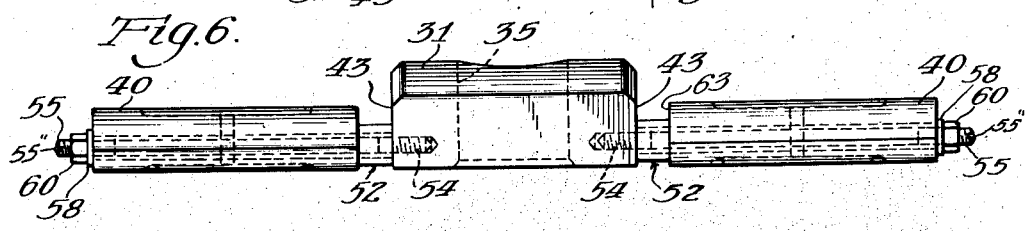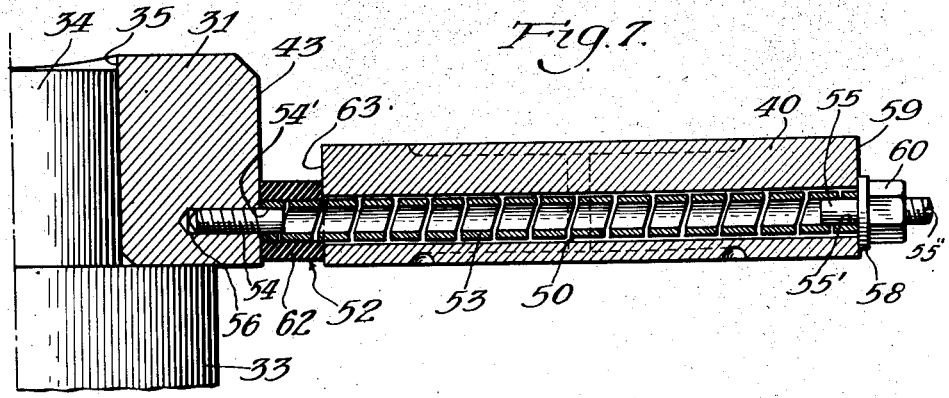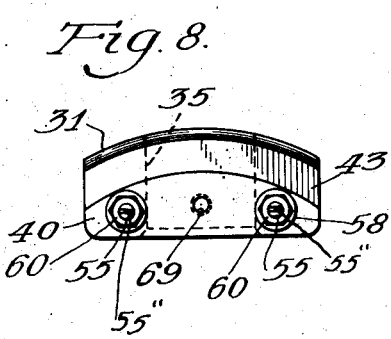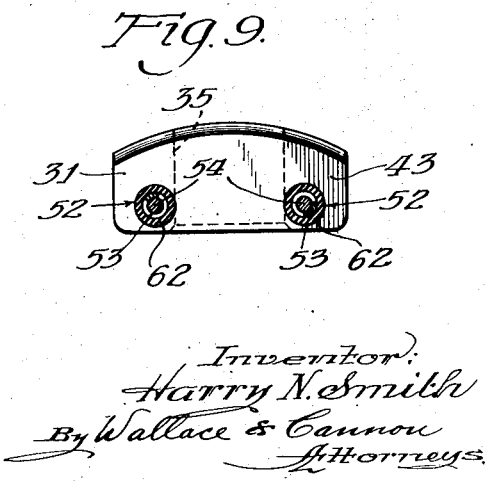

Patented Dec. 22, 1942

2,305,703

UNITED STATES PATENT OFFICE 2,305,703

SLIPPER BEARING

Harry N. Smith, Dearborn, Mich., assignor to The American Brake Shoe and Foundry Company, Wilmington, Del., a corporation of Delaware Application April 25, 1942, Serial No. 440,513

14 Claims. (Cl. 64—7)

This invention relates to bearings and particularly to slipper bearings for universal couplings and the like.

In the rotative transmission of mechanical power there are many instances in which the driving and driven shafts are independently supported, and under such circumstances the independence of support or the need for relative adjustment of one or the other of the shafts often results in misalignment of the two shafts. Where such a condition is to be met it is necessary to interconnect the shafts by universal couplings or the like to provide for a continuous driving connection between the shafts despite the existence of such an angular relation therebetween. Many different types of universal couplings are employed in such circumstances, the particular type being determined by the particular environment and the character and amount of the torque loads to be encountered. In one conventional form of universal coupling that has been widely used for the transmission of relatively heavy loads, cooperating male and female members are respectively formed on or secured to the adjacent ends of the shafts, the male member including a longitudinally projecting flat tongue or fishtail which is inserted into a bifurcation afforded in a female member. The branches of the bifurcated female member are arcuately recessed transversely thereof and such recesses are located so as to be disposed in opposing relation to the opposite side faces of the tongue when the tongue is inserted into the bifurcation, thereby to define a pair of opposed semi-cylindrical pockets providing arcuate bearing surfaces located on opposite sides of the tongue. Each of the aforesaid pockets or recesses serves to receive a slipper bearing, and such bearing has a convex bearing surface that conforms to the configuration of the arcuate bearing surface of the recess and also a flat bearing face that conforms to an adjacent face of the aforesaid tongue, and a bearing pin which passes through a suitable opening in the tongue serves to maintain such slipper bearings in spaced relation. Where the shafts are rotated under circumstances where they are not in axial alignment, the angular relation of the tongue and female member changes constantly, whereupon the slipper bearings rock within the recesses in the female member and upon the arcuate bearing surfaces provided by such recesses and the tongue pivots about the bearing pin, whereby two angular related axes are afforded about which the associated shafts may pivot in the course of such rotation.

Intermediate the ends of such slipper bearings it is customary to provide a boss which has an opening therein which serves as a socket to receive an end of the bearing pin, and usually this boss is of greater thickness than the end portions of the bearing. Correspondingly, the portions of the recesses or arcuate bearing portions of the female member which mate with the slipper bearings are more deeply recessed at the medial parts thereof than are the remaining parts thereof to thereby form an arcuate groove which accommodates the thickened boss when the end portions of the bearings are in bearing contact with the end portions of the recesses, and through engagement of the edges of the boss with the shoulders provided by the sides of the arcuate groove, the slipper bearings are retained in the proper relation within the recesses.

The major portion of the wear attendant to operation of universal couplings of the aforesaid character has been found to occur at or near the end portions of the slipper bearings and the parts of the female member with which such end portions cooperate, the amount of wear becoming progressively greater toward the outer edges of the coupling. Where the female portions are worn as aforesaid and it becomes necessary to replace one slipper bearing with another, there are instances where, until the new slipper bearing wears down so as to conform to the worn portions of the female member, the slipper bearing will be subjected to appreciable stresses and strains which tend to break the slipper bearings. The wear of the female bearing portion of the coupling may vary considerably in various coupling installations, and when a slipper bearing is placed in an operative relation in a worn coupling, the application of driving torque between the two members of the coupling tends to bend the slipper bearing so as to conform with the worn surface of the female member of the coupling. This action tends to produce breakage of the slipper bearing adjacent the central portion thereof and since such slipper bearings usually embody a central boss which cooperates with the arcuate groove in preventing endwise displacement of the bearings, such breakage takes place at or near the juncture of the end portions of the slipper bearing with the boss portion thereof.

Another objectionable type of stress often encountered in the use of slipper bearings of the aforesaid type is caused by endwise shifting or pounding of the drive spindle when the supporting bearings fail to accomplish their intended purpose. In such endwise pounding of the drive spindle the fishtail exerts a substantial pounding action upon the bearing pin of the slipper bearing assembly, tending to displace the slipper bearings transversely of the arcuate recesses of the female member of the coupling. Since the boss portion of each slipper bearing is normally spaced from the bottom of the groove in which the boss portion rides, the boss portions are, in such conventional slipper bearings, usually ineffective to absorb or resist the pounding forces exerted by the spindle in its endwise shifting or pounding movement. As a result, this force must be resisted by the engagement of the end portions of the slipper bearing with the arcuate bearing surfaces of the female portion of the coupling. The location or spacing of such points of engagement may vary considerably but are in every instance spaced in opposite directions from the point of engagement of the spacing or bearing pin with the central boss. Hence the slipper bearings in such an instance act as beams supported at spaced points between which the bearing pin exerts a substantial pounding or loading force. This action often results in breakage of the slipper bearing transversely thereof and substantially through the central opening of the boss.

In the copending application of Harry C. Irvin, Serial No. 412,737, filed September 29, 1941, there is disclosed and claimed slipper bearing structure which overcomes the foregoing difficulties, and it is the object of the present invention to enable these difficulties to be avoided through the use of a simplified and more economical structure; and an object related to the foregoing is to overcome these difficulties through the use of structure which is particularly adapted for quantity manufacture.

A further and more specific object of the invention is to provide a three-piece slipper bearing in which each end section is interconnected with the boss of the bearing in a simple and effective manner which enables the bearing to transmit torque without the production of breaking stresses when worn couplings are encountered; related objects are to so construct such a slipper bearing that the end sections may be readily removed and replaced as wear conditions require, and to enable the construction of the end sections to be relatively simple and economical in character.

The feature of enabling the end sections of a slipper bearing to be removed from the coupling without disconnection of the male and female elements of the coupling is disclosed in the copending application of Thomas J. Healy, Ser. No. 412,750, filed, September 29, 1941, while the feature of enabling the end sections of a slipper bearing to shift relative to the boss section is disclosed in the copending application of Thomas J. Healy, Ser. No. 412,751, filed September 29, 1941, in combination with the feature of removability of the end sections; and in the copending applications of Harry C. Irvin, Ser. No. 412,737 and 412,740, both filed September 29, 1941, further improvements are disclosed relating to this combination of features; and the present invention is concerned with improvements over the inventions disclosed in the aforesaid applications.

Other and further objects of the present invention will be apparent from the following description and claims and will be understood by reference to the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a fragmental elevational view of a portion of a rolling mill in which slipper bearings of the present invention may be employed;

Fig. 2 is a fragmental perspective view of a universal coupling in partially disassembled condition, showing the manner in which one form of my novel slipper bearing structure is embodied in the coupling;

Fig. 3 is an enlarged cross-sectional view of the aforesaid universal coupling;

Fig. 4 is a longitudinal sectional view of the coupling taken on the line 4—4 on Fig. 3;

Fig. 5 is a plan view of one of the slipper bearings of Figs. 2, 3 and 4.

Fig. 6 is a front elevational view of the slipper bearing shown in Fig. 5;

Fig. 7 is an enlarged and fragmental longitudinal sectional view taken on the line 7—7 of Fig. 5;

Fig. 8 is an end elevational view of the slipper bearing looking from the right in Fig. 6; and Fig. 9 is a cross-sectional view of the slipper bearing taken along the line 9—9 of Fig. 5.

One common use for slipper bearings of the character to which the present invention relates is found in the roll driving means for the either reversing or continuous type of steel rolling mills and the like, such as the mill 10 fragmentally illustrated in Fig. 1. The rolling mill 10 comprises a pair of opposed rolls 11 having reduced end portions or pintles 12 extending through and journaled in bearings 13 carried by frame members as 14, and these pintles 12 are connected by universal couplings 16 to the ends of drive spindles 15. The other ends of the spindles 15 are connected by universal couplings 17 to stub shafts 18 journaled in a frame member 19, and rotation is imparted to the stub shafts 18 by the driving means which includes gearing 20 fixed to the shafts 18. To afford adjustability of the rolls 11 in accordance with the size of the rolls or the thickness of the material that is to be worked upon, the bearings as 13 are arranged to be vertically positioned at selected points in the frame members as 14. Thus the upper roll 11 may be adjusted from the full-line position thereof in this view to accommodate a greater thickness of material or for other purposes, thus causing the upper spindle 15 to assume a position such as the position indicated by broken lines so that this spindle 15 is angularly disposed with respect to the associated pintle 12 and stub shaft 18. The lower spindle 15 is supported at its middle by a thrust or spindle carrier bearing 21 which is supported in any suitable manner. When the vertical adjustment of the upper roll 11 is varied, the position of the upper spindle 15 is changed in the manner just described, and the bearing 21 for the upper spindle is correspondingly re-positioned and maintained in an operative spindle supporting relationship by a conventional bearing supporting bar 22.

The universal couplings 16 and 17 which interconnect the opposite ends of the spindles 15 with the rolls 11 and stub shafts 18 afford driving connections between these various rotatable members even though they are not longitudinally aligned with each other. As shown in detail in Fig. 2, each universal coupling comprises a female member 25 which is formed on or secured to an end of a spindle as 15, Fig. 1, and a male member 26 which is provided on the adjacent end of an associated stub shaft as 18 or a pintle as 12. The male member 26 is in the form of a flat tongue that may be inserted into a bifurcation in the female member 25. Arcuate or cylindrical recesses 27, Figs. 2, 3 and 4, are formed in the branches of the bifurcation in the female member 25 to provide arcuate bearing surfaces that extend transversely to the free edges thereof of the female member, and deeper recesses or grooves 28 concentric with the recesses 27 are afforded in the member 25 between the free ends of the semicylindrical openings defined by the recesses 27.

A pair of slipper bearings 30 are respectively interposed between the tongue 26 and the arcuate recesses in the branches of the bifurcation in the female member 25, as shown in Fig. 3, each such slipper bearing 30 having flat and convex surfaces to conform respectively with the tongue 26 and the arcuate recesses in the female member 25. The medial or boss portion 31 of each slipper bearing 30 is of greater thickness than the end sections 40 of the bearing, and these bosses 31 seat in the deeper recesses 28 while the end sections 40 are seated in the recesses 27. The bosses 31 of the slipper bearings 30 are interconnected and maintained in spaced relation with each other by a bearing pin 33 having reduced end portions 34 which are received in socket openings as 35 in these bosses, the pin 33 passing through a suitable slot or other opening 37 in the tongue 26.

Where the shafts or other elements which are interconnected by a universal coupling 16 or 17 are not axially aligned, as is the case when the upper spindle is in the broken-line position thereof shown in Fig. 1, the slipper bearings 30 are rocked back and forth in their recesses 27 and 28, Figs. 3 and 4, as the angular position of the tongue 26 with respect to the female member 25 changes in the course of rotation of these parts. However, longitudinal movement of the slipper bearings 30 is prevented by end faces 43 of the bosses 31 which are engaged by the shoulders 44, Fig. 4, intermediate the recesses 27 and 28 in the female member. Thus, the tongue 26 may pivot about two axes, one being afforded by the bearing pin 33 and the other by the generally cylindrical or concentric bearing surfaces of the recesses 27 upon which the slipper bearings are seated.

As will be evident in Fig. 3, the rotative force or reaction exerted by the tongue 26 upon each slipper bearing 30 is borne substantially entirely by only one of the end sections 40 of each such bearing in instances where the directions of rotation remains substantially constant. These heavily stressed end sections 40 of the slipper bearings 30 and the cooperating portions of the female member 25 undergo a relatively rapid rate of wear, and this wear is greatest on both of the opposed load-transmitting surfaces adjacent to the ends of the slipper bearings. As the support for such end sections becomes weakened due to changes in the configuration of the mating surfaces there is a tendency for these end sections to bend relative to the bosses 31 of the slipper bearings, particularly when these bosses are firmly seated in the recesses 28 in the manner explained hereinafter. As stated hereinabove, it is a purpose of the present invention to enable such bending movement and relative readjustment of the more heavily stressed end sections 40 to take place without unduly straining the slipper bearing assembly.

In accordance with the present invention the end sections 40 of each slipper bearing 30 are detachably secured to the boss 31 thereof so as to render each end section 40 capable of independent shifting movement relative to the boss 31 in such a manner as to enable each such end section 40 to adjust itself independently to the configuration of the cooperating arcuate bearing surface 27 in the female member 25 of the coupling without placing an undue strain upon the slipper bearing assembly. This is attained by means which is simple in structure and is effective to maintain the elements of the slipper bearing assembly in a normal relationship which simplifies the coupling operation and facilitates mounting of the slipper bearing assembly in the coupling. Thus, as shown in detail in Figs. 5 to 9 inclusive of the drawings, the end sections 40 and the boss 31 of each slipper bearing are held in assembled operative relation by means which includes resilient elements located so as to afford limited independent movement of the end sections 40 relative to the boss 31 while tending at all times to maintain the three bearing sections in their normal relationship of Figs. 5, 6 and 7. The means whereby such association of the sections of the slipper bearing is attained are of such a character that forces applied between the end sections and the boss which might tend to shear an ordinary rigid securing means therebetween will be ineffective to cause undue strain, or breaking or shearing of the securing means. Thus, as shown in detail in Figs. 5 to 8 of the drawings, the end sections 40 have elongated openings or bores 50 formed therein so as to extend longitudinally thereof. In the present instance two such bores 50 are provided in laterally spaced relation in each of the end sections 40, and independent securing means are provided for association with each of the bores 50. Thus, as shown in Fig. 5 of the drawings, a securing means or device 52 is provided for association with each of the bores 50, means being provided for anchoring or securing each securing device 52 on the boss 31 in alignment with the bore 50 with which such device 52 is to be associated. In the preferred form herein illustrated the securing devices 52 each comprises an elongated member constructed and arranged so that it may be bent laterally and stretched longitudinally. Thus each securing device 52 includes elongated spirally wound spring 53 of such a size that it may extend relatively loosely through one of the bores 50, and means is provided on opposite ends of the spring 53 for connecting the same to the boss 31 and to the end section 40 respectively.

The connecting means in the present instance comprises a pair of threaded studs 54 and 55 which extend snugly into the opposite ends of the coil springs 53 and are fixed to the coils of the spring. The desired fixed connections between the spring 53 and the studs 54 and 55 may be effected in different ways but I prefer to attain this purpose by forming a sweated connection 54' between the stud 54 and the spring 53 and a sweated connection 55' between the stud 55 and the spring 53. To facilitate the formation of the sweated connections between the parts the spring 53 is preferably formed from spring stock of a flat or rectangular cross section, thereby to provide for the maximum area of contact between the inner faces of the coils and surfaces of the studs 54 and 55. The arrangement is such that the studs 54 and 55 extend only far enough to obtain sufficient bearing for sweating or welding the stud to the spring so as to allow maximum spring movement especially at point 54′. The threaded end of the stud 54 is secured in a threaded socket 56 formed so as to extend into the side face 43 of the boss 31, and by rotation of the entire spring structure the stud 54 is screwed into the socket 56 until the adjacent end of the spring 53 is in firm abutment with the face 43. The end section 40 is held in position on the spring 53 by detachable means such as a washer 58 which abuts the outer end face 59 of the end section and a nut 60 which is threaded onto the projecting end of the stud 55.

It will be evident that the yielding connections afforded by the springs 53 enable the end sections 40 to shift throughout a variety of different movements without any tendency to shear or break the parts of connecting means, and in enabling this relatively free movement to be attained while insuring that the parts of the slipper bearing will be maintained in a substantially normal relation to each other when they are not subject to bending or other forces, a spacing means is provided between the bosses 31 and the end sections 40. This spacing means is of a resilient character and in the present instance comprises a solid resilient sleeve 62 surrounding each of the springs 53 between the connected boss and end section. The sleeve 62 may be formed from a reinforced rubber or other rubber-like materials so as to fit relatively snugly about the spring 53 with one end of the sleeve 62 bearing against the face 43 of the boss 31 and the other end of the sleeve 62 bearing against the inner end face 63 of the end section 40. When the parts of the slipper bearing are assembled the nuts 60 are tightened to such an extent that the spring 53 is placed under tension, this tension being sufficient to maintain the inner end face 63 of the end section 40 in firm abutment with the outer end faces of the sleeves 62. Thus the parts of the slipper bearing are urged to a predetermined normal relationship such that clearance is assured between the two slipper bearings of a coupling into which a tongue 26 may be freely and easily inserted in a coupling operation.

The tightening of the studs 54 in their mounting sockets 56 is facilitated under the present invention by coordinating the leads of the various threaded connections with the leads of the springs 53. Since it is desirable to use right hand threads for the securing nuts 60, the springs 53 are also formed with a right hand lead so that as the nuts 54 are tightened, the rotative force will be effectually transmitted through the springs 53 so as to tighten the studs 54 in their sockets 56. The stud 55 is provided with a screw driver slot 55′ whereby backing out of the stud 55 may be prevented when nut 60 is removed for bearing replacement.

When slipper bearings constructed in accordance with the present invention are employed, the forces applied to such slipper bearings may act to maintain the bearing surfaces of the end sections 40 in proper engagement with the arcuate female surface 27 even though such bearing surfaces may be badly worn. As the end sections 40 are thus moved relative to the bosses 31 the springs 53 may bend laterally, the resilient spacing sleeves 62 may bend or be compressed in various portions thereof, or in the event that the slipper bearings are shifted in a direction parallel to the face 43 of the boss 31, the portions of the springs 53 located intermediate the outer ends of the studs 54 and the adjacent inner ends 63 of the end sections may be bent into what might be termed a flat S curve to thereby maintain the desired connection between the end sections and the boss and insure that the desired normal relationship will be restored when the shifting forces have been removed.

Since the extent of such shifting of the end sections relative to the boss 31 in a direction generally parallel to the surface 43 may be quite pronounced under some operating conditions, the spring 53 may be constructed as herein shown so as to readily afford the desired range of possible movement. Thus, as shown in Fig. 7, the spring steel stock from which the spring 53 is formed is relatively wide and thin and is so coiled that the wide or broad faces of the strip are concentrically located about the axis of the spring 53. With this construction such shifting or displacement of the end section relative to the boss merely causes yielding lateral distortion of the spring 53 without permanent deformation of the spring, and hence the parts of the slipper bearing are in every instance yieldingly urged toward their normal relationship.

Thus, the connection afforded between each section 40 and the boss 31 of the slipper bearing 30 possesses hinge-like characteristics, and in addition, provides for shifting of the end sections substantially parallel to the adjacent edges or faces of the boss and end sections, and hence the present invention enables the slipper bearings to give satisfactory service despite badly worn conditions of the end sections of the bearing or of the cooperating portions of the female member 25. For example, assuming that the portions of the arcuate bearing surface 27 of the female member 25 cooperating with the more heavily stressed end sections 40 of the slipper bearing 30 have been relieved due to wear, as indicated at 27′ in a somewhat exaggerated manner in Fig. 3, these end sections 40 may nevertheless be urged by the tongue 26 into intimate contact with the bearing surface without any tendency to strain the slipper bearing assembly.

Where the couplings or other elements of the driving connection have become so worn as to allow endwise shifting or pounding movement of the spindle 15, it has been found that detrimental and destructive forces are applied to the slipper bearings. In such shifting movement of the spindle 15 the pounding action of the spindle is exerted through the tongue 26 upon the bearing pin 33 transversely of the bearing pin, this force being in turn exerted upon the boss portions by the bearing pin, and the force thus exerted by the bearing pin 33 has been applied to the slipper bearing so as to stress the slipper bearing as a simple beam. This action has often resulted in breakage of the slipper bearing at substantially the midpoint of the boss section or, in other words, through the pin receiving opening such as the opening 35. In the aforesaid copending applications of Harry C. Irvin, Ser. No. 412,737 and Ser. No. 412,740, slipper bearings are disclosed which resist these pounding forces without the aforesaid beam action in the slipper bearings, and this end is also attained in the slipper bearings of this invention. In accomplishing this result the boss section 31 is constructed of such a thickness that its arcuate surface may seat against the bottom of the arcuate groove 28 when a pounding force is exerted thereon due to endwise shifting of the spindle 15, the ends 34 of the pin 33 being so formed, Figs. 3 and 4, that the pin ends do not engage the bottom of the groove 28. This seating or bottoming action of the bosses prevents the creation of beam-like forces in the slipper bearing and is fully described in the aforesaid application of Harry C. Irvin, and is rendered possible in the present slipper bearing construction by the yielding or bendable character of the connecting means 52 by which the end sections 40 are associated with the bosses 31.

Since one of the end sections 40 may tend to wear more than the other end section of a particular slipper bearing, it may become advantageous to replace a worn or otherwise damaged end section. When an end section 40 of the present slipper bearing becomes excessively worn it may be removed from the coupling in which it is mounted without disassembling the coupling, and to do this it is merely necessary to loosen and remove the adjacent securing nuts 60 to enable withdrawal of such an end section. In order to facilitate removal of the end sections 40 from the slipper bearing assembly, tapped openings or sockets 69 are provided in the outer ends of the end sections 40 so that a tool as 70, Fig. 5, having a threaded shank may be screwed into the tapped opening 69 of an end section 40, whereupon this end section may be conveniently withdrawn from the coupling.

When a new end section 40 is inserted endwise into the coupling so that the springs 53 and studs 55 extend through the bores 50 of the end section, the inner end face of the end section 40 will first move into abutment with the adjacent end of the resilient sleeve 62. The springs 53 will have contracted so as to locate the outer end of the spring 53 slightly inwardly of the outer ends of the bores 50 but the threaded ends of the studs 55 will project outwardly beyond the outer end faces 59 of the end section so that the washers 58 and nuts 60 may be placed on the studs 55. The nuts 60 are then tightened so as to place the springs 52 under tension, thereby to draw the end section 40 and its inner end face 63 into firm abutment with the spacing sleeves 62, and such rotation being applied in a right hand direction to the nuts 60 acts through the springs 53 to tighten the studs 54 in the sockets 56. Thus the ends of the resilient spacing sleeves 62 are drawn firmly against the adjacent faces of the boss and the end section, thereby rendering each sleeve 62 effective as a shield to prevent entry of particles of metal and the like between the coils of the spring 53. Moreover, the normally parallel relationship of the two ends of the two sleeves 62 function in conjunction with the contractive action of the springs 53 to normally position the end sections 40 in a predetermined relation to their boss 31, and hence an ample clearance is afforded for entry of the tongue in the course of a coupling operation. The sleeves 62, being somewhat resilient in character, may be compressed to a slight degree by the action of the springs 53, but since such compression is uniform, the desired normal relationship of the end section and the boss is attained.

From the foregoing description it will be apparent that the present invention provides an improved and simplified slipper bearing structure which is so arranged that when the more heavily stressed end section of a slipper bearing is engaged by the male tongue of the universal coupling in the course of transmitting torque between the male and female members, such end section may yield until it receives the support of the cooperating female bearing surface without placing any undue strain upon the bearing structure as a whole. Moreover, the present slipper bearing prevents breakage of the slipper bearings due to endwise pounding of the spindle, and worn end sections in the slipper bearings may be readily and easily replaced without uncoupling the connected rotative members. These advantages are attained in the present instance by making the slipper bearings of three-piece construction which preserves the general form of the conventional one-piece slipper bearings heretofore employed in universal couplings. Therefore, slipper bearings constructed in accordance with my invention may be employed in existing universal couplings without necessitating any redesigning or reshaping of the male and female members thereof.

The resilient connecting devices 52 may, of course, be bent or compressed unevenly so that the end section may conform with the condition of wear of the bearing surfaces and as a result an end section may be brought into maximum bearing contact with the opposed female bearing surface of the coupling. Such readjusting movement of an end section in the present slipper bearing is accomplished without producing undesired and objectionable stresses in the central boss or in the end section, the shifting movement serving merely to bend or compress the resilient connecting devices 52 in the amount required. The construction of the resilient connecting devices under this invention is such that shearing or breaking forces are avoided in the connecting devices, thereby to insure proper operation and long life of the slipper bearings. This end is attained by the present invention in such a manner that the end sections 40 are of a relatively simple form. Moreover, the end sections as thus formed are relatively simple to manufacture, so that the cost of replacement of the end sections is minimized.

Thus, while I have illustrated and described a selected embodiment of my invention, it is to be understood that this embodiment is capable of variation and modification and I therefore do not wish to be limited to the precise details set forth but desire to avail myself of such changes and alterations as fall within the purview of the following claims.

I claim:

1. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss portions located within said groove and separately formed end sections having convex faces to conform with and bear against other portions of said arcuate recesses and also having flat faces respectively disposed toward and bearing against opposed flat faces of said tongue, a bearing pin extended through the opening in said tongue and into the medial parts of said bearings, and connecting means securing said end sections and said boss together, said connecting means for each end section including at least one coil spring having one end secured to the end section and the other end secured to the adjacent side of the adjacent boss and so constructed and arranged that said boss and connected end section are enabled to move relative to each other and are constantly urged toward a predetermined normal relationship.

2. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss portions located within said groove and separately formed end sections having convex faces to conform with other portions of said recesses and also having flat faces respectively disposed toward opposed flat faces of said tongue, and a bearing pin extended through the opening in said tongue and into the medial parts of said bearings, said pin having oppositely facing shoulders thereon acting to space said boss portions apart so that as an incident to the application of a force to said pin transversely thereof and generally toward said groove said boss portions are bottomed in said arcuate groove and are wedged against said shoulders to thereby limit and resist relative endwise approaching movement of said male and female members of the coupling, and coil springs extending between and connected to said end sections and their respective boss portions to enable relative movement therebetween in a direction substantially perpendicular to said flat faces whereby to enable said boss portions to bottom in said arcuate groove and attain said wedging action under widely varying conditions of wear in said coupling and permit relative pivotal movement of said end sections to conform with worn cooperating bearing surfaces of the female member of the coupling.

3. In a multi-part slipper bearing a boss section and at least one end section disposed adjacent to and extending from said boss section, spacing means interposed between said boss section and said end section, and resilient means acting between said end section and said boss to urge said end section toward said spacing means.

4. In a multi-part slipper bearing a boss section and at least one end section disposed adjacent to and extending from said boss section, elongated longitudinally resilient connecting means acting between said end section and said boss section and operable to yieldingly urge said sections toward each other, and means interposed between said sections to space the sections from each other and constructed and arranged for cooperation with said resilient connecting means to locate said end section in a predetermined relation to said boss section.

5. A slipper bearing of the character described comprising a boss, at least one end section disposed at one side of said boss, spacing means between said boss and said end section operable normally to maintain a predetermined spaced relation therebetween, and resilient connecting means acting resiliently to hold said boss and said end section together against opposite sides of said spacing means.

6. A multi-part slipper bearing comprising a boss section and a separately formed elongated end section disposed in spaced relation to one side of said boss section so as to extend from said boss section, spacing means interposed between said sections, anchoring means operatively related to said boss section and to said end section, and means extended between and connecting said anchoring means and operable to yieldingly urge said sections toward each other.

7. A multi-part slipper bearing comprising a boss section and a separately formed elongated end section disposed in spaced relation to one side of said boss section so as to extend from said boss section, spacing means interposed between said sections, anchoring means operatively related to said boss section and to said end section, said end section having at least one mounting formed longitudinally therethrough, and connecting means for securing said end section to said boss section comprising an elongated coil spring anchored at one of its ends on said boss section and extending into said mounting opening, and means connected to the other end of said spring acting against a portion of said end section to place said spring under tension and thereby render said spring effective to maintain said end section yieldingly in contact with said spacing means.

8. A multi-part slipper bearing comprising separately formed boss and end sections disposed in adjacent but spaced relation to each other, spacing means interposed between said sections and constructed and arranged to maintain said sections in spaced relation during limited relative pivotal movement as well as transverse shifting movement of said sections, and connecting means extended between said sections and constructed and arranged to urge said sections yieldingly toward each other, said connecting means including means located in the space between said sections and so constructed and arranged as to be bendable laterally in the event of transverse relative shifting movement of said sections.

9. A slipper bearing comprising a boss section and a separately formed elongated end section having a longitudinal mounting opening therethrough, an elongated coil spring formed from relatively flat spring stock so wound that the broad flat surfaces of said stock are concentric with the axis of the spring, said spring having one of its ends anchored to said boss section and being extended into one end of and at least part of the way through said mounting opening, a stud connected to said spring within said opening and extending therefrom beyond the other end of said mounting opening, means between said sections constructed and arranged to space said sections in such a degree as to dispose a laterally bendable portion of said spring in the space between said sections, and means on said stud operable to place said spring under tension.

10. A slipper bearing comprising a boss section and a separately formed elongated end section having a longitudinal mounting opening therethrough, an elongated coil spring formed from relatively flat spring stock so wound that the broad flat surfaces of said stock are concentric with the axis of the spring, said spring having threaded studs extending into opposite ends thereof so as to leave a substantial portion of the length of said spring free for lateral bending or stretching movement, said studs having threaded portions thereof extending beyond the ends of said spring and one of said studs being threaded into said boss section, said spring being extended into one end of said mounting opening so that the other of said studs projects from the other end of said opening, spacing means surrounding said spring intermediate said sections, and a nut threaded on said other stud and acting to place said spring under tension.

11. A slipper bearing comprising a boss section and a separately formed elongated end section having a longitudinal mounting opening therethrough, an elongated coil spring formed from relatively flat spring stock so wound that the broad flat surfaces of said stock are concentric with the axis of the spring, said spring having thread studs extending into opposite ends thereof so as to leave a substantial portion of the length of said spring free for lateral bending or stretching movement, said studs having threaded portions thereof extending beyond the ends of said spring and one of said studs being threaded into said boss section, said spring being extended into one end of said mounting opening so that the other of said studs projects from the other end of said opening, spacing means surrounding said spring intermediate said sections, and a nut threaded on said other stud and acting to place said spring under tension, the direction of lead of said spring and of the threads on said studs being the same in a rotative sense whereby tightening force applied to said nut acts effectually through said spring to tighten the threaded connection between said one stud and said boss section.

12. A slipper bearing having a boss section, a separately formed end section having a mounting opening formed therethrough, spacing means interposed between said sections, a coil spring disposed so as to extend through said mounting opening, mounting studs fixed within opposite ends of said spring so as to extend outwardly therefrom, said mounting studs having threads thereon having the same direction of lead as said spring, said boss having a socket formed therein thread complemental to one of said studs and into which said one of said studs may be screwed, and a fastening nut threaded on the other of said studs and acting against said end section to place said spring under tension.

13. A multi-part slipper bearing comprising a boss section and a separately formed elongated end section disposed in spaced relation to one side of said boss section so as to extend from said boss section in a predetermined normal relation, spacing means between said sections, anchoring means operatively related to said boss section and to said end section, and resilient means connecting said anchoring means to hold said sections in said normal relation and enable relative movement of said sections from said normal relation to distort said resilient means and produce tension therein tending to return said sections to said normal relation.

14. A multi-part slipper bearing comprising a boss section and a separately formed elongated end section disposed in spaced relation to one side of said boss section so as to extend from said boss section in a predetermined normal relation, said end section having a longitudinal mounting opening extended therethrough, an elongated coil spring anchored at one of its ends on said boss section and extended into said mounting opening, and means connecting the other end of said spring to said end section to enable said spring to maintain said sections in said normal relation and to enable relative movement of said sections from said normal position to distort said spring and impart tension to the spring tending to return said sections to said normal relation.

HARRY N. SMITH.